United States Patent
Klein (10) Patent No.: US 10,360,234 B2
(45) Date of Patent: Jul. 23, 2019

(54) RECURSIVE EXTRACTOR FRAMEWORK FOR FORENSICS AND ELECTRONIC DISCOVERY

(71) Applicant: SAP SE, Walldorf (DE)

(72) Inventor: Udo Klein, Eggenstein-Leopoldshafen (DE)

(73) Assignee: SAP SE, Walldorf (DE)

( * ) Notice: Subject to any disclaimer, the term of this patent is extended or adjusted under 35 U.S.C. 154(b) by 328 days.

(21) Appl. No.: 15/335,004

(22) Filed: Oct. 26, 2016

(65) Prior Publication Data

US 2018/0113920 A1 Apr. 26, 2018

(51) Int. Cl.
*G06F 16/25* (2019.01)
*G06F 16/178* (2019.01)

(52) U.S. Cl.
CPC ........ *G06F 16/258* (2019.01); *G06F 16/1794* (2019.01)

(58) Field of Classification Search
None
See application file for complete search history.

(56) References Cited

U.S. PATENT DOCUMENTS

| | | | | |
|---|---|---|---|---|
| 7,779,032 B1* | 8/2010 | Garfinkel | .......... | G06F 17/30067 707/776 |
| 9,426,071 B1* | 8/2016 | Caldejon | .......... | G06F 17/30424 |
| 10,120,913 B1* | 11/2018 | Mullins | ............. | G06F 17/30545 |
| 2005/0114835 A1* | 5/2005 | Francis | .................. | G06F 9/4493 717/118 |
| 2009/0234818 A1* | 9/2009 | Lobo | ................. | G06F 17/30719 |
| 2015/0334413 A1* | 11/2015 | Gorin | ..................... | H04N 19/46 375/240.26 |
| 2016/0330255 A1* | 11/2016 | Denoual | ................ | H04N 19/30 |

* cited by examiner

*Primary Examiner* — Christopher J Raab
(74) *Attorney, Agent, or Firm* — Mintz Levin Cohn Ferris Glovsky and Popeo, P.C.

(57) ABSTRACT

A method, a system, and a computer program product for data extraction are disclosed. At least one container of data is analyzed to determine format of at least a portion of data contained in the container. Based on the determined format of the portion of data, at least one extractor in a plurality of extractors is selected to extract the portion of data from the container. The portion of data is extracted from the container and a structure of the extracted portion of data is generated for performing analysis of a content of the extracted portion of data.

15 Claims, 9 Drawing Sheets

RECURSIVE EXTRACTOR FRAMEWORK FOR FORENSICS AND ELECTRONIC DISCOVERY

TECHNICAL FIELD

This disclosure relates generally to data processing and, in particular, to using a recursive extractor framework for data extraction.

BACKGROUND

Today, many companies and individuals rely on software applications in conducting their daily activities. The software applications include email, word processing applications, internet browsing applications, financial software applications, sales applications, and/or many other types of applications. Software is typically used by individuals to perform a variety of tasks and can involve vast amounts of data being generated, exchanged, manipulated, stored, etc. Periodically, data is subject to electronic discovery and can be requested for review, analysis, etc. such as, during a governmental investigation, a lawsuit, etc.

Prior to analysis of data, data may need to be extracted. One of the main challenges of data extraction is that data is typically stored in a multitude of different formats. Most existing data analysis systems export data in proprietary formats or do not export parsed data. Hence, users are oftentimes forced to use the same tools for analysis and data extraction. This leads to a situation where users are required to work with a variety of different tools to perform extraction and analysis of data, which can be inefficient and very costly. Thus, there is a need to provide a data extraction system that is separate from data analysis system, which can leverage a plurality of data extraction tools irrespective of specific type of data or data analysis tools.

SUMMARY

In some implementations, the current subject matter relates to a computer-implemented method for extracting data. The method can include analyzing at least one container of data to determine format of at least a portion of data contained in the container, selecting, based on the determined format of the portion of data, at least one extractor in a plurality of extractors to extract the portion of data from the container, extracting the portion of data from the container, and generating a structure of the extracted portion of data for performing analysis of a content of the extracted portion of data. At least one of the analyzing, the selecting, the extracting, and the generating can be performed on at least one processor of at least one computing system.

In some implementations, the current subject matter can include one or more of the following optional features. The method can also include determining, based on the extracted portion of data, whether additional data is to be extracted from the container; extracting the additional data from the container based on the additional data having a first format, where the first format can identify data allowed to be extracted; and preventing extraction of the additional data from the container based on the additional data having a second format, where the second format can identify data that is not allowed to be extracted.

In some implementations, the selected extractor can include at least one of the following: a built-in extractor, an external extractor, and a remote extractor.

In some implementations, the container can include at least one of the following: a data, a metadata, a structured content data, an unstructured content data, another container of data, a hard disk, a memory card (e.g., an SD card), a cellular telephone memory, a main memory image, a forensic container, a zip file, a file, a memory image, an email message, a text, a video, an audio, a graphic, and any combination thereof.

In some implementations, the method can include generating at least one hash identifying the extracted data, and determining, based on the generated hash, whether to extract another portion of data contained in at least one of the following: the container and at least another container.

In some implementations, extraction of data can include parsing the data contained in the container, and extracting, based on parsing, the data.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide use of a recursive extractor framework for extraction of data.

In some implementations, the current subject matter can extract data from a data container, which can be raw data that is may have been collected as a result of a request. The current subject matter can perform analysis of the container of data to determine format of data in the container (e.g., email, text, graphics, etc.). A driver component of a recursive extraction framework can perform such analysis and select at least one extractor component for extraction of data from the container. Extraction can include parsing and extracting of data sufficient to determine initial structure of data in the container. The extraction of data can avoid extracting data that is embedded or nested, if so desired. The structure can be used for performing analysis of a content of the extracted data.

In some implementations, the current subject matter can provide a framework for performing extraction of data from one or more containers of data. A container of data can include data, metadata, structured content data, unstructured content data, other containers of data (e.g., embedded or nested in the container), hard disks, cellular telephone memories, main memory images, forensic containers, zip files, files, memory images, and/or any other data/information. The data can be in various formats, such as email messages, text files, video, audio, graphics, etc.

Figure 1:
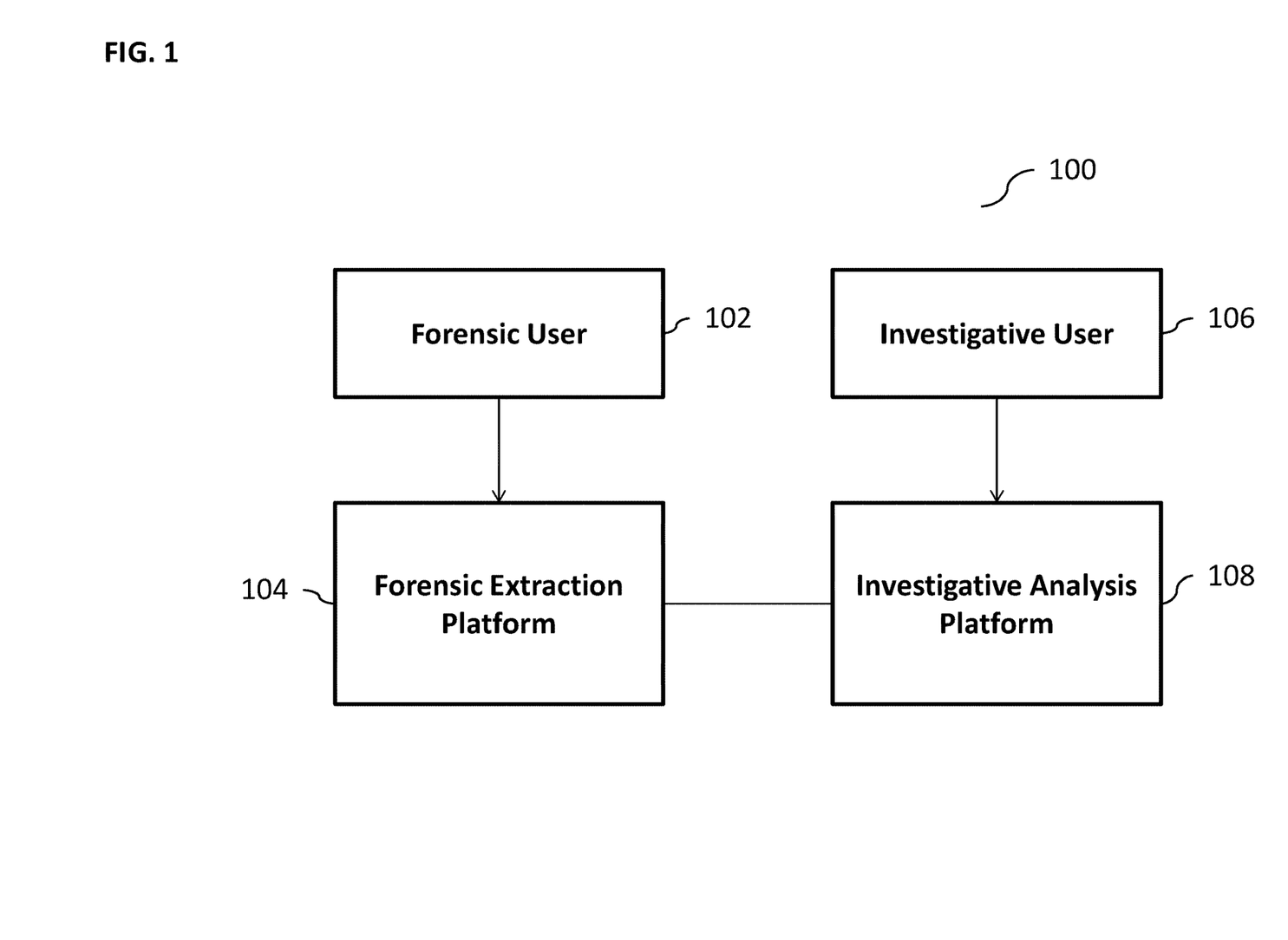
FIG. 1 illustrates an exemplary system for using a forensic extraction platform to extract data, according to some implementations of the current subject matter.

FIG. 1 illustrates an exemplary system 100 for using a forensic extraction platform to extract data, according to some implementations of the current subject matter. The system 100 can include a forensic extraction platform 104 communicatively coupled with an investigative analysis platform 108. A forensic user 102 can access the forensic extraction platform 104 for the purposes of extraction of data. An investigative user 106 can access the investigative analysis platform 108 for the purposes of analyzing data by the forensic extraction platform 104. The forensic extraction platform 104 can be communicatively coupled to the investigative analysis platform 108 using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The forensic extraction platform 104 and/or investigative analysis platform 108 can include any combination of hardware and/or software. In some implementations, the platforms 104, 108 can be disposed on one or more computing devices, such as, server(s), database(s), personal computer(s), laptop(s), cellular telephone(s), smartphone(s), tablet computer(s), and/or any other computing devices and/or any combination thereof. In some implementations, the platforms 104, 108 can be disposed on a single computing device and/or can be part of a single communications network. Alternatively, the platforms can be separately located from one another.

The forensic user 102 can access the forensic extraction platform 104 via a network, such as a network described above. The investigative user 106 can access the investigative analysis platform 108 using a similar network. The users 102 and 106 can be a single user and/or can be different users. The users 102, 106 can be individual users, computing devices, software applications, objects, functions, and/or any other types of users and/or any combination thereof. The user 102 can generate an instruction/command to the forensic extraction platform 104 to extract data from a container. The instruction/command can be in a form of a query, a function call, and/or any other type of instruction/command. In some implementations, the instructions/commands can be provided using a microphone (either a separate microphone or a microphone imbedded in the user's computing device), a speaker, a screen (e.g., using a touchscreen, a stylus pen, and/or in any other fashion), a keyboard, a mouse, a camera, a camcorder, and/or using any other device. The user 102 can also instruct the forensic extraction platform to provide data that has been extracted from a container to the investigative analysis platform 108 for further analysis and/or review by the platform 108 and/or the investigative user 106.

Figure 2:
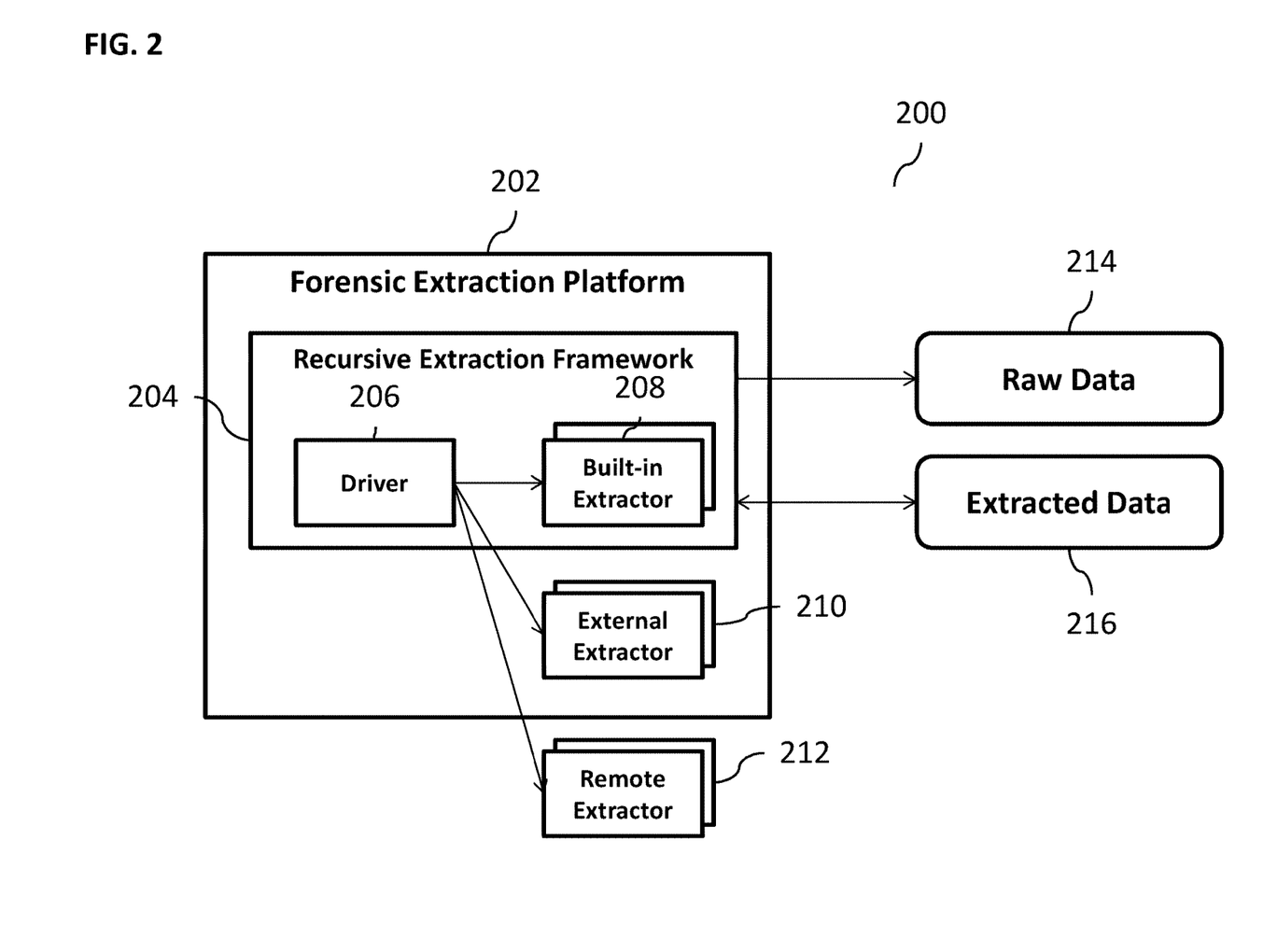
FIG. 2 illustrates an exemplary forensic extraction system, according to some implementations of the current subject matter.

FIG. 2 illustrates an exemplary forensic extraction system 200, according to some implementations of the current subject matter. The system 200 includes a forensic extraction platform 202 (similar to forensic extraction platform 104 shown in FIG. 1). The forensic extraction platform 202 can receive raw data 214, extract and output extracted data 216. The raw data 214 can include any data, metadata, structured content data, unstructured content data, container(s) of data (e.g., embedded or nested within a container), zipped files, hard disks, cell phone memories, main memory images, forensic containers, files, memory images, compressed data, uncompressed data, encrypted data, unencrypted data, email messages, web pages, text files, video, audio, graphics, and/or any other information, and/or any combination thereof. The extracted data 216 can include an identification of types of data present in the raw data, an identification of metadata present in the raw data 214, containers of data present in the raw data 214, identification of the structure of the data, structured data content, and/or any other information, and/or any combination thereof.

The forensic extraction platform 202 can access the raw data 214 via one or more communications networks. The communications networks can include at least one of the following: a wired network, a wireless network, MAN, LAN, WAN, VLAN, an internet, an extranet, an intranet, and/or any other type of network and/or any combination thereof. Alternatively, the raw data 214 can be imported into one or more storage locations that can be associated with and/or accessible by the forensic extraction platform 202. The extracted data 216 can be stored in one or more storage locations that can be accessible by the forensic extraction platform 202. In some implementations, the extracted data 216 can be transmitted by the forensic extraction platform 202 to one or more external entities, e.g., an investigative analysis platform 108, as shown in FIG. 1. The extracted data 216 can be transmitted using one or more communications networks, which can include at least one of the following: a wired network, a wireless network, MAN, LAN, WAN, VLAN, an internet, an extranet, an intranet, and/or any other type of network and/or any combination thereof.

The forensic extraction platform 202 can include a recursive extraction framework component 204. The recursive extraction framework 204 can include a driver component 206 and at least one built-in extractor component 208. The recursive extraction framework 204 can also be communicatively coupled to at least one external extractor 210, which can be part of the forensic extraction platform 202, and at least one remote extractor 212, which can be disposed externally to the forensic extraction platform 202. The extractors 208-212 can be any known extractors and can be used to extract data. In some implementations, one or more extractors can be designated for extraction of specific types of data (e.g., emails) while other extractors can be used to extract another type of data. Alternatively, any and/or all extractors 208-212 can be used to extract any type of data. Further, one or more extractors 208-212 can be used to extract data based on a source, location, specific characteristic, etc. of raw data 214. Alternatively, any and/or all extractors 208-212 can be used to extract any raw data irrespective of its source, location, specific characteristic, etc.

In some implementations, an extractor 208-212 (or a decoder) used by the recursive extraction framework 204 can include any combination of hardware and/or software, a code, a library, a function, a service, etc. and/or any combination thereof. The extractor can parse a container (which is received by the recursive extraction framework) and extract data from that container. The result of the extraction can include metadata (e.g., when was the data extracted, by whom, by which extractor, checksum/hash of the original container, etc. and/or any combination thereof), a structured content of the container (e.g., structure of the data in the container), an identification of nested and/or embedded containers, and/or any combination thereof. For example, a hard disk can contain a partition, which can be one or more containers. Alternatively, a partition can contain a file system, which can also be considered a container. Further, a file can be a zip or other compressed file, which can also be a container. Additionally, an email can contain attachments, which can be considered containers as well. Other types of nesting/embedding of data within data are possible.

In some implementations, extractors 208-212, upon extraction of data, can determine/decode a "primary" format of the container (e.g., an email, an image, a zip file, etc.) without determining formats of other data that may be nested/embedded. The extractors 208-212 can determine that the extracted/decoded data refers to other data (i.e., other containers) that can be nested/embedded therein. This can result in reduction of storage space, such as in a case when different extracted emails refer to the same attachment instead of containing it as a copy.

Alternatively, extractors can extract all data including any data that may be nested/embedded. This may be useful when it desired to determine all information contained in the structured content or any part of it (e.g., only the text content of a power point presentation or steno-graphically hidden content inside pictures).

In some implementations, the driver 206 can include any combination of hardware and/or software, a code, a library, a function, a service, etc. and/or any combination thereof. The driver 206 can make a determination which extractor 208-212 can be used to extract data from a particular container. The driver 206, upon determination which extractor is applicable to a specific container, can consume the raw data 214 by applying one or more extractors 208-212 to that container. If after the extraction, additional nested/embedded containers are found and are determined to be eligible for further extraction, the driver 206 can make a determination whether further extraction can be performed and which extractor 208-212 is to be used for the subsequent extraction.

Figure 3A:
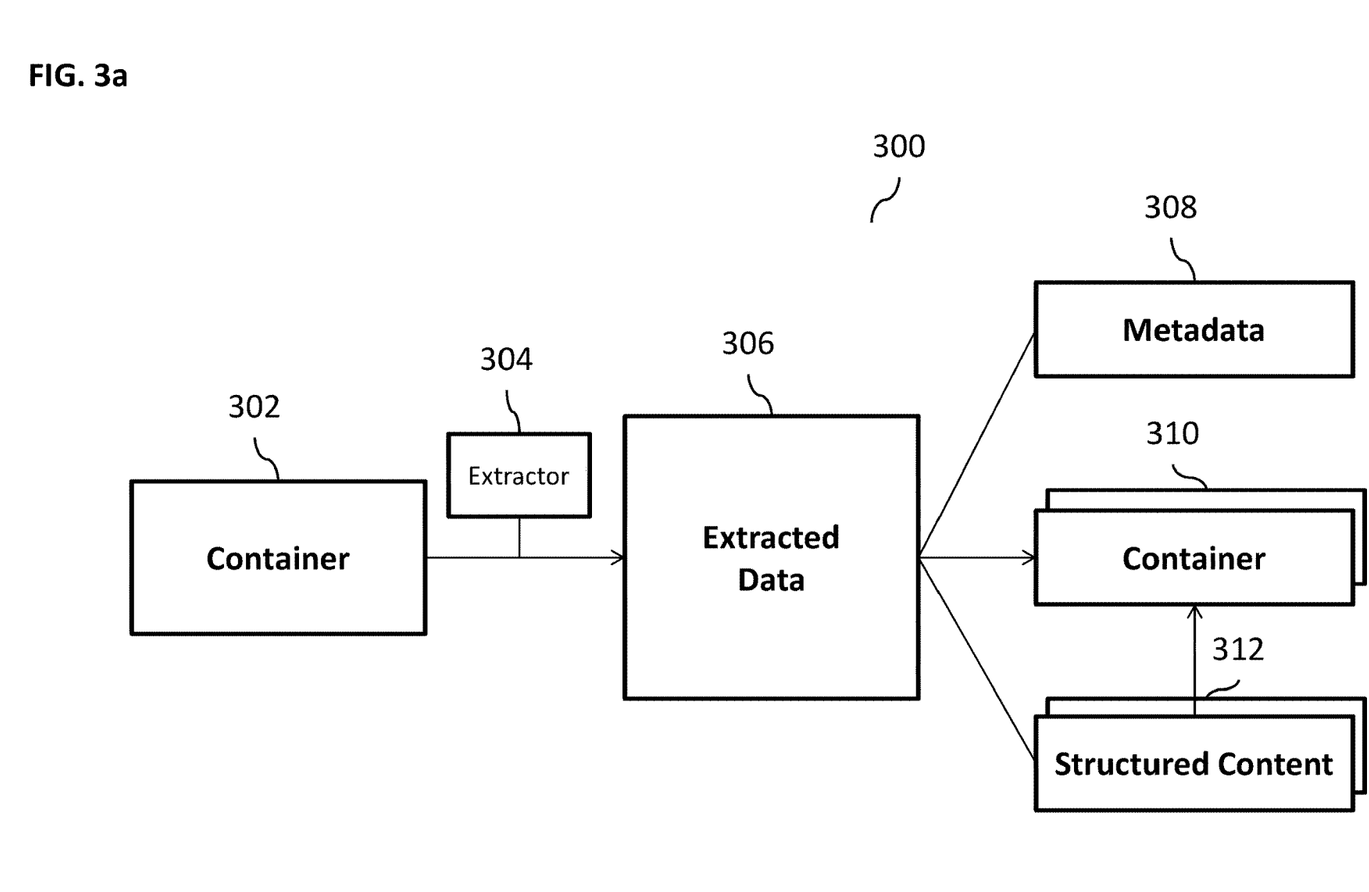
FIG. 3a illustrates an exemplary process for extracting data from a container using forensic extraction platform, according to some implementations of the current subject matter.
Figure 3B:
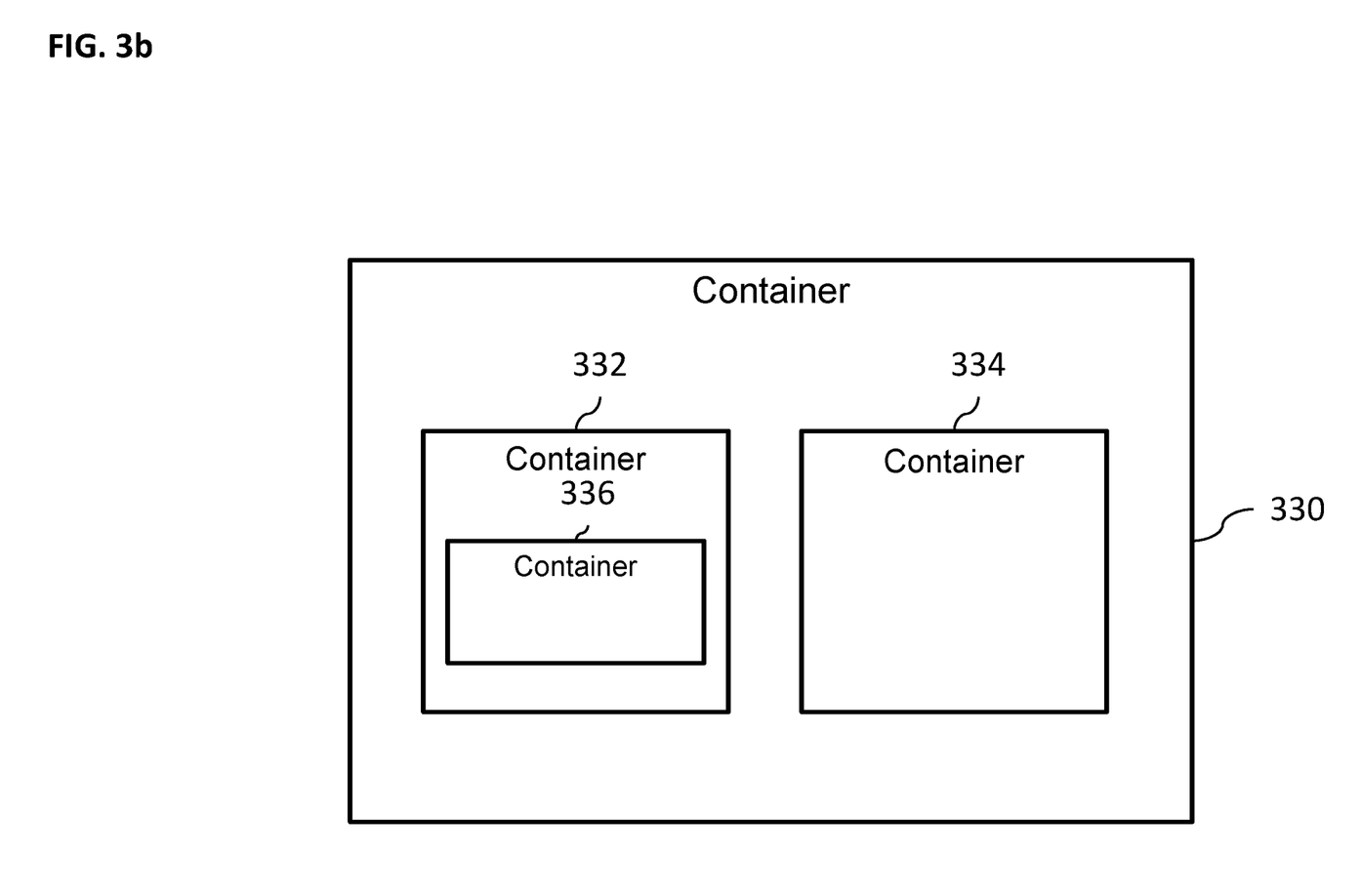
FIG. 3b illustrates an exemplary nested/embedded container, according to some implementations of the current subject matter.

FIG. 3b illustrates an exemplary nested/embedded container 330, according to some implementations of the current subject matter. The container 330 can include nested/embedded containers 332 and 334. The container 332 can also include a nested/embedded container 336. For example, container 330 can be an email document, containers 332 and 334 can be text documents and container 336 can be a graphic.

In some implementations, the recursive extraction framework 204 can include a table of hashes that the driver 206 can refer to in determining whether or not extraction of data from containers and/or nested/embedded containers is possible and/or permitted. The table of hashes can be generated based on prior extraction activities and can include data fingerprints/secure hashes that the driver 206 can use in determining whether to proceed with/stop further extraction of data. The hash table can also be distributed to extractors 208-212 so that the extractors do not necessarily perform extraction of data when extraction is not permitted, possible, and/or whether extraction of a particular data has been already performed. For example, upon detection of a known hash corresponding to an email containing an attachment that has been previously determined to exist in another extracted email, the driver 206 can determine that further extraction is unnecessary. Alternatively, even if the driver 206 detects that a particular data has been already extracted, it may be necessary to extract such data again from a nested/embedded container.

Figure 3C:
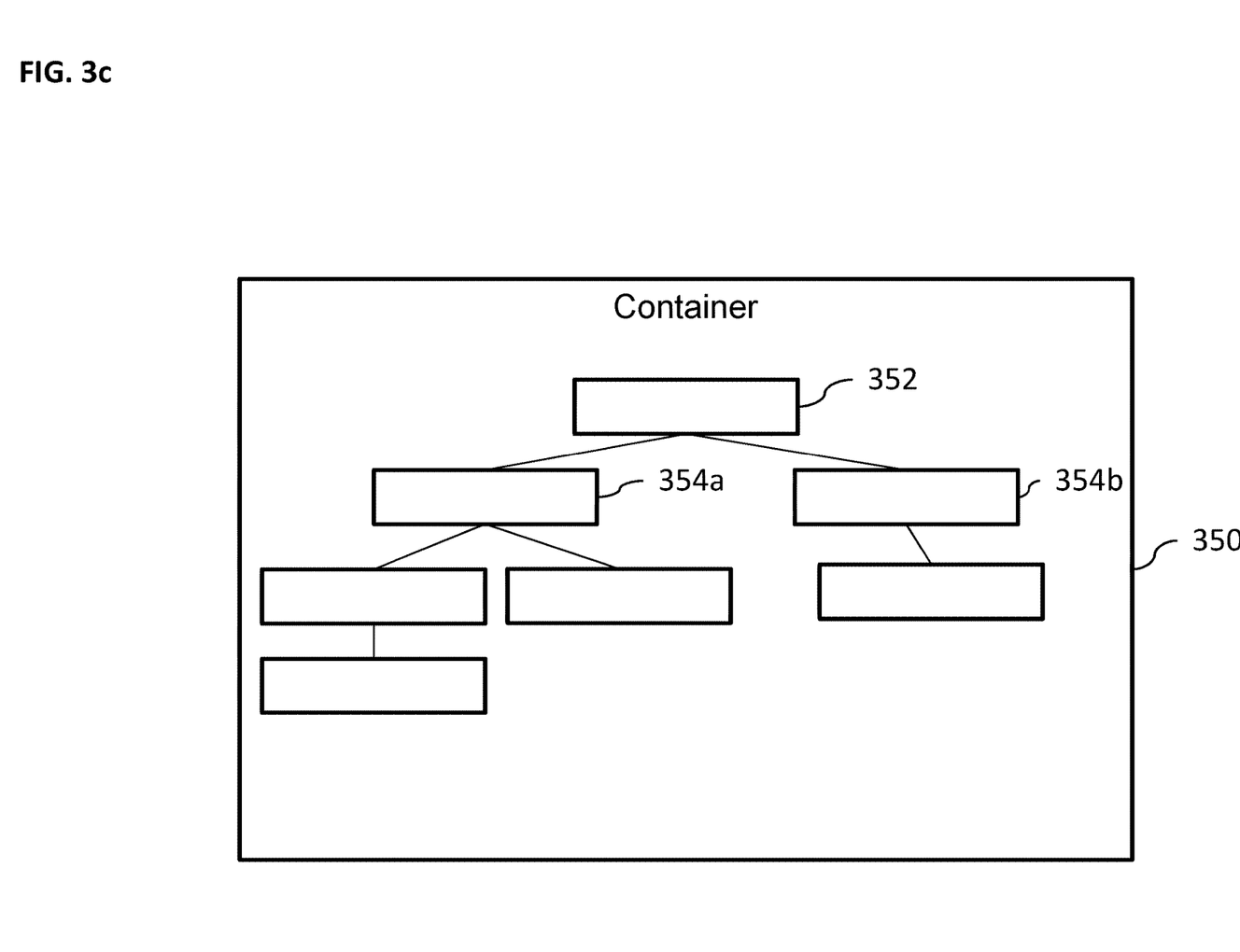
FIG. 3c illustrates an exemplary structure of the data extracted from a container by one or more extractors shown in FIG. 2, according to some implementations of the current subject matter.

In some implementations, subsequent to the extraction of data, the driver 206 can generate a structure of the extracted data. FIG. 3c illustrates an exemplary structure of the data extracted from a container 350 by one or more extractors 208-212 (shown in FIG. 2), according to some implementations of the current subject matter. The structure can include a root node 352 and child nodes 354 (*a, b*), which in turn can include other child nodes that may be dependent on them. Each node can represent extracted data, metadata, and/or a reference to another container (e.g., nested/embedded container) and/or another container.

FIG. 3a illustrates an exemplary process 300 for extracting data from a container using forensic extraction platform, according to some implementations of the current subject matter. A container 302 can be imported and/or otherwise accessed by the forensic extraction platform 202 (as shown in FIG. 2). The recursive extraction framework 204 can determine which extractor 304 (which can be similar to extractors 208-212 shown in FIG. 2) is to be used to generate extracted data 306. The extracted data 306 can include metadata 308, identification of containers 310 that may be nested/embedded in the container 302 and/or containers 310 themselves, and structure of the content 312.

One or more extractors 304 can perform extraction of data from container 302 based on instructions received from the driver 206 (as shown in FIG. 2). The instructions can include an indication which extractor 304 is to be used to extract data from a particular container 302. Additionally, the driver can make a determination whether extracted data appears as a duplicate of another extracted data and can instruct an extractor not to perform any extraction in the event it encounters similar data again. Further, the driver can store information about extracted data (e.g., hashes) after each round of extraction of data from a container. The hashes can be distributed to extractors and/or other drivers to inform them of what data has been already extracted. This can allow determination by the driver and/or the extractors whether or not to extract similar data again in a next round of extractions. In some implementations, the driver can store metadata associated with data that has been extracted as well as which extractors have been used to extract specific data and/or which extractors are to be used to extract particular type of data.

Some of the advantages of the current subject matter can allow an efficient reuse of the extractors for data extraction purposes. Additionally, the current subject matter system can allow separation of the data extraction and data analysis aspects of forensic investigations so that the processes can be more efficient and cost-effective.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 4:
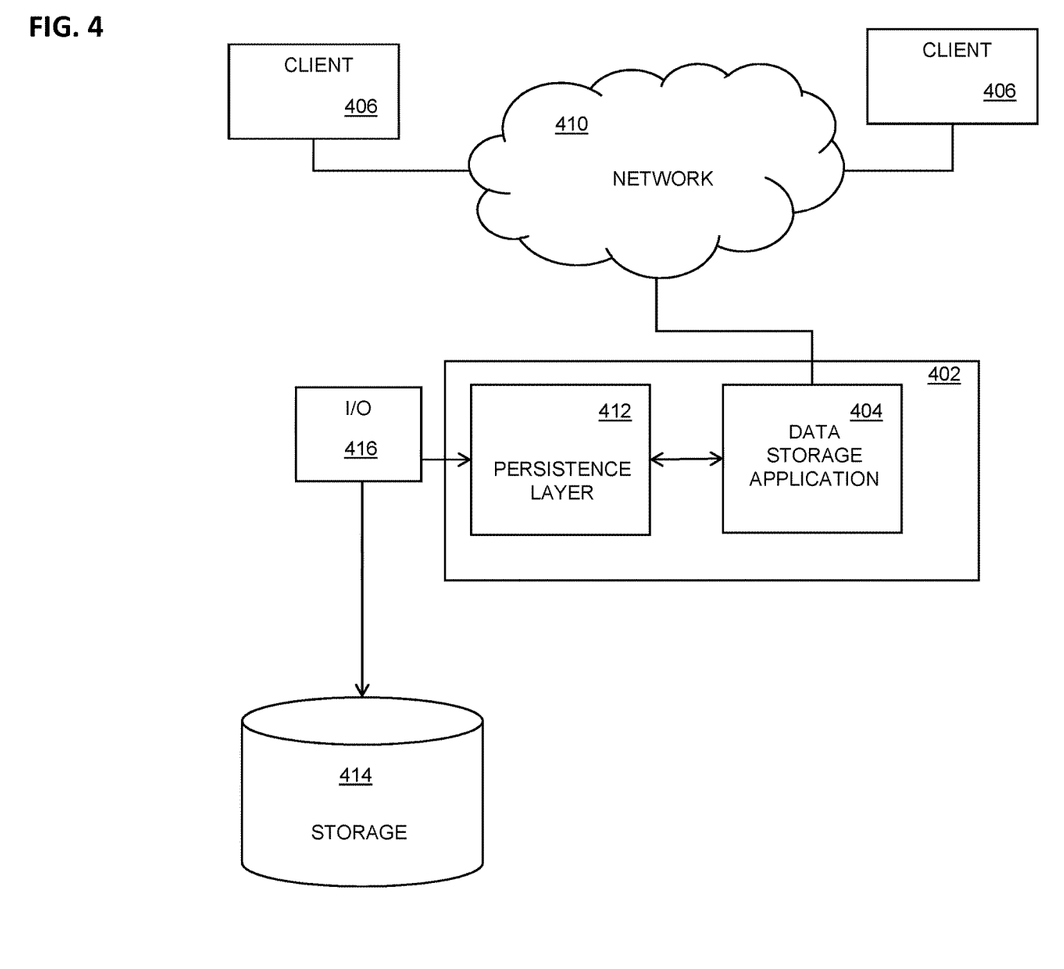
FIG. 4 is a diagram illustrating an exemplary system including a data storage application, according to some implementations of the current subject matter.

FIG. 4 illustrates an exemplary system 400 in which a computing system 402, which can include one or more programmable processors that can be collocated, linked over one or more networks, etc., executes one or more modules, software components, or the like of a data storage application 404, according to some implementations of the current subject matter. The data storage application 404 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 402 as well as to remote users accessing the computing system 402 from one or more client machines 406 over a network connection 410. One or more user interface screens produced by the one or more first modules can be displayed to a user, either via a local display or via a display associated with one of the client machines 406. Data units of the data storage application 404 can be transiently stored in a persistence layer 412 (e.g., a page buffer or other type of temporary persistency layer), which can write the data, in the form of storage pages, to one or more storages 414, for example via an input/output component 416. The one or more storages 414 can include one or more physical storage media or devices (e.g. hard disk drives, persistent flash memory, random access memory, optical media, magnetic media, and the like) configured for writing data for longer term storage. It should be noted that the storage 414 and the input/output component 416 can be included in the computing system 402 despite their being shown as external to the computing system 402 in FIG. 4.

Data retained at the longer term storage 414 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 5:
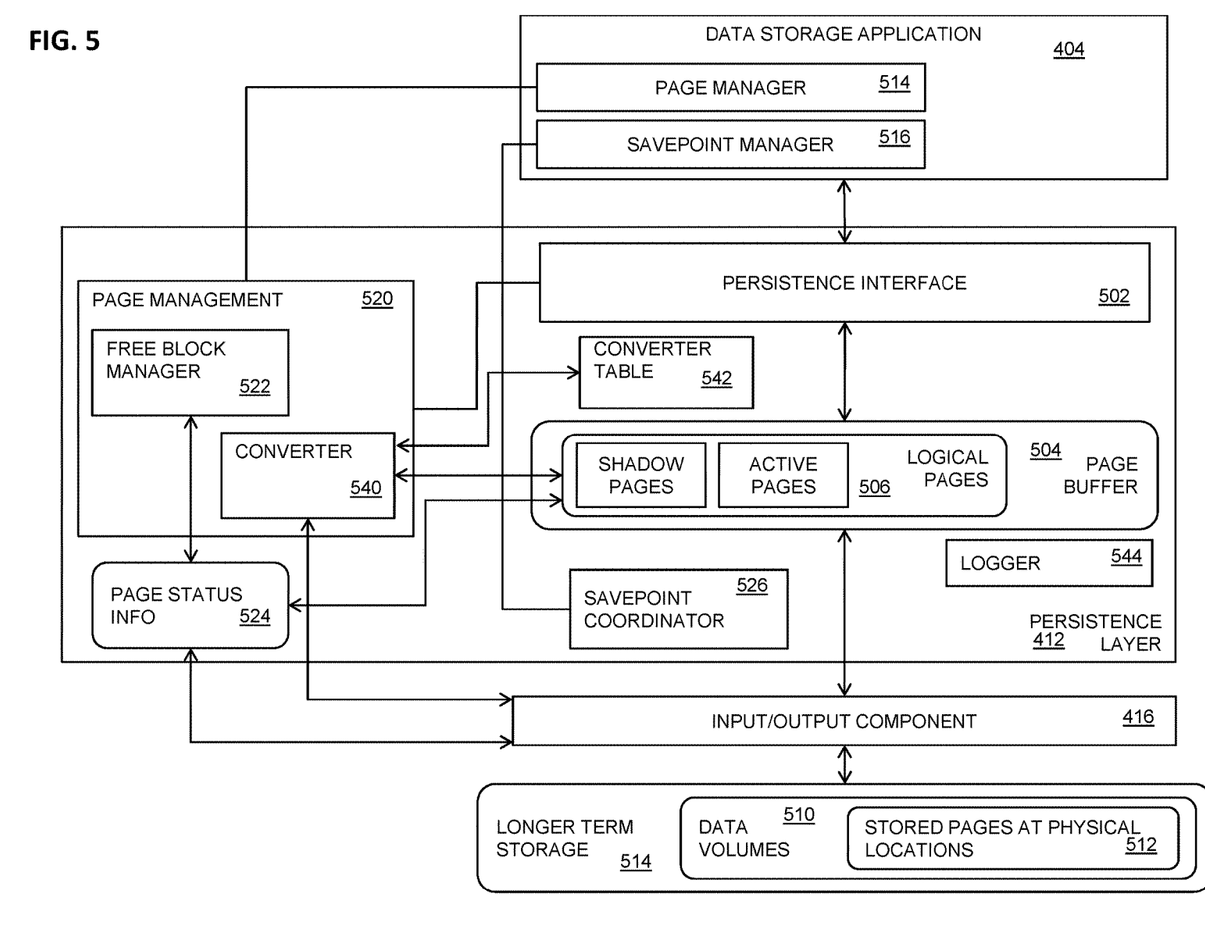
FIG. 5 is a diagram illustrating details of the system of FIG. 4.

FIG. 5 illustrates exemplary software architecture 500, according to some implementations of the current subject matter. A data storage application 404, which can be implemented in one or more of hardware and software, can include one or more of a database application, a network-attached storage system, or the like. According to at least some implementations of the current subject matter, such a data storage application 404 can include or otherwise interface with a persistence layer 412 or other type of memory buffer, for example via a persistence interface 502. A page buffer 504 within the persistence layer 412 can store one or more logical pages 506, and optionally can include shadow pages, active pages, and the like. The logical pages 506 retained in the persistence layer 412 can be written to a storage (e.g. a longer term storage, etc.) 414 via an input/output component 416, which can be a software module, a sub-system implemented in one or more of software and hardware, or the like. The storage 414 can include one or more data volumes 510 where stored pages 512 are allocated at physical memory blocks.

In some implementations, the data storage application 404 can include or be otherwise in communication with a page manager 514 and/or a savepoint manager 516. The page manager 514 can communicate with a page management module 520 at the persistence layer 412 that can include a free block manager 522 that monitors page status information 524, for example the status of physical pages within the storage 414 and logical pages in the persistence layer 412 (and optionally in the page buffer 504). The savepoint manager 516 can communicate with a savepoint coordinator 526 at the persistence layer 412 to handle savepoints, which are used to create a consistent persistent state of the database for restart after a possible crash.

In some implementations of a data storage application 404, the page management module of the persistence layer 412 can implement a shadow paging. The free block manager 522 within the page management module 520 can maintain the status of physical pages. The page buffer 504 can include a fixed page status buffer that operates as discussed herein. A converter component 540, which can be part of or in communication with the page management module 520, can be responsible for mapping between logical and physical pages written to the storage 414. The converter 540 can maintain the current mapping of logical pages to the corresponding physical pages in a converter table 542. The converter 540 can maintain a current mapping of logical pages 506 to the corresponding physical pages in one or more converter tables 542. When a logical page 506 is read from storage 414, the storage page to be loaded can be looked up from the one or more converter tables 542 using the converter 540. When a logical page is written to storage 414 the first time after a savepoint, a new free physical page is assigned to the logical page. The free block manager 522 marks the new physical page as "used" and the new mapping is stored in the one or more converter tables 542.

The persistence layer 412 can ensure that changes made in the data storage application 404 are durable and that the data storage application 404 can be restored to a most recent committed state after a restart. Writing data to the storage 414 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 544 can also be included to store the changes made to the data of the data storage application in a linear log. The logger component 544 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 544 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 412 can use a combination of undo log entries (from one or more logs) and shadow paging.

The persistence interface 502 can handle read and write requests of stores (e.g., in-memory stores, etc.). The persistence interface 502 can also provide write methods for writing data both with logging and without logging. If the logged write operations are used, the persistence interface 502 invokes the logger 544. In addition, the logger 544 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 544. For an entry of type "update", for example, this would be the identification of the affected record and the after image of the modified data.

When the data application 404 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 544 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 544 can write a database log (or simply referred to herein as a "log") sequentially into a memory buffer in natural order (e.g., sequential order, etc.). If several physical hard disks/storage devices are used to store log data, several log partitions can be defined. Thereafter, the logger 544 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 404 can use shadow paging so that the savepoint manager 516 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 6:
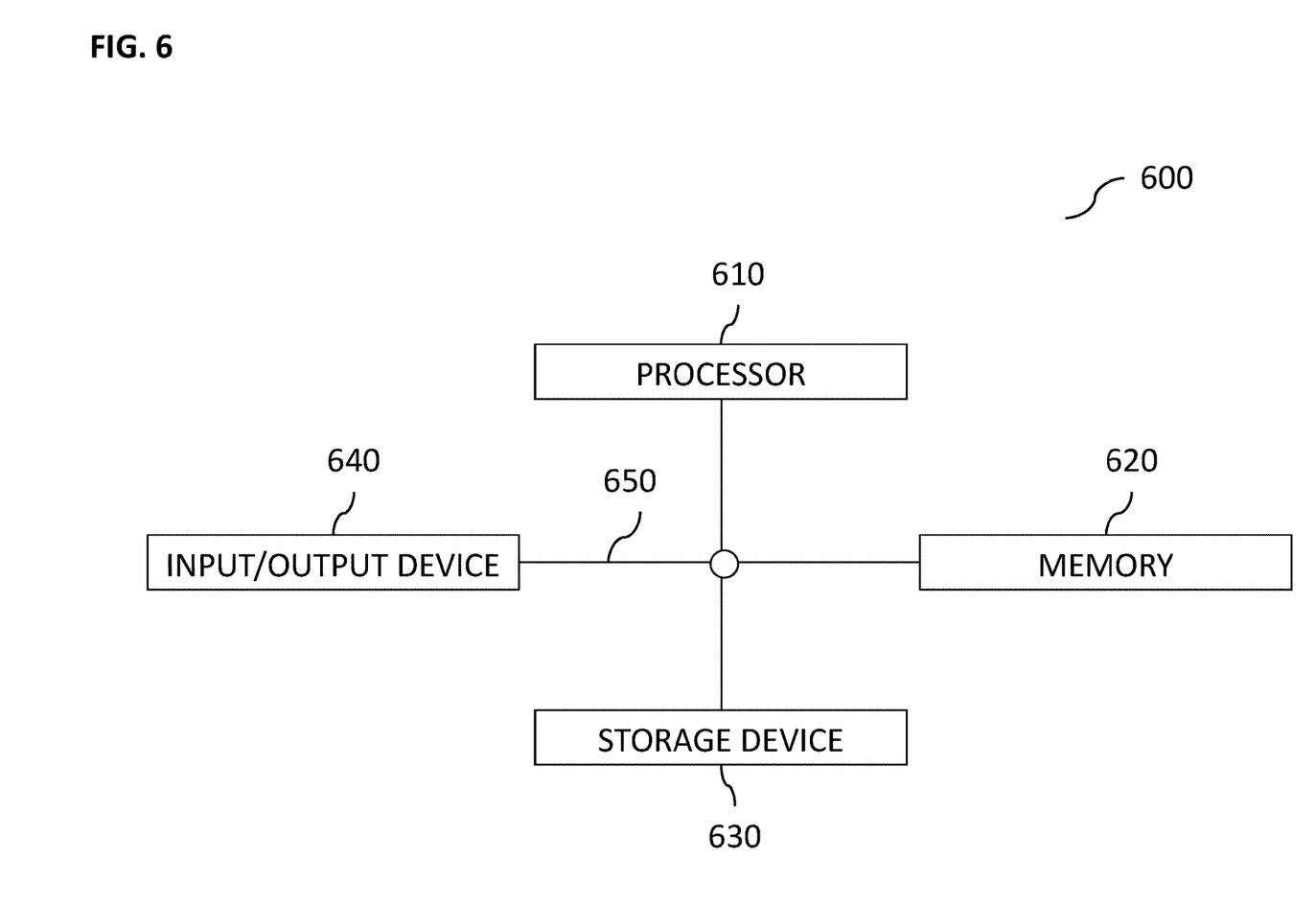
FIG. 6 is an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
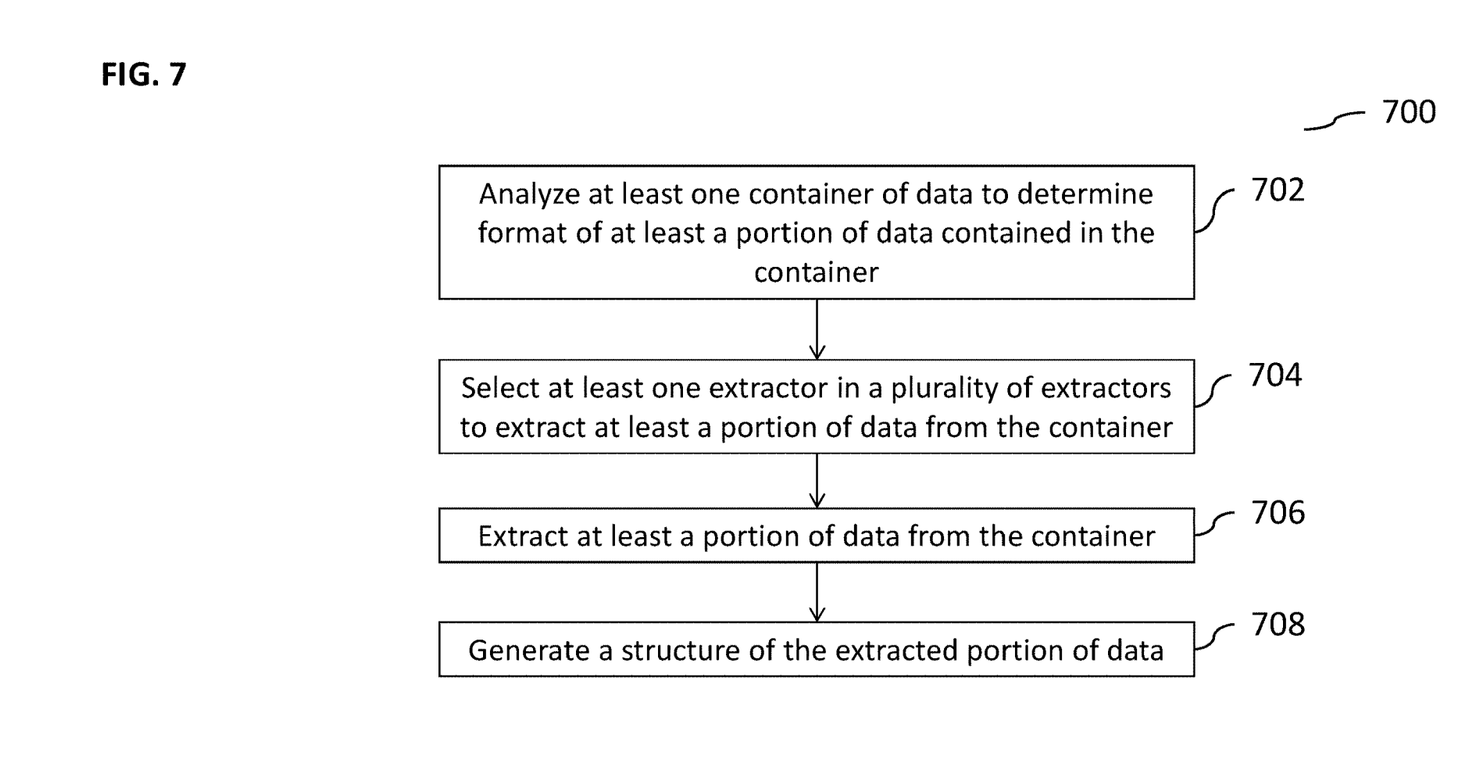
FIG. 7 is an exemplary method, according to some implementations of the current subject matter.

FIG. 7 illustrates an exemplary method 700 for extracting data from a data container, according to some implementations of the current subject matter. At 702, at least one container of data can be analyzed to determine format of at least a portion of data contained in the container. The analysis can be performed by the driver 206 in the recursive extraction framework 204, as shown in FIG. 2. At 704, at least one extractor (e.g., extractors 208-212 as shown in FIG. 2) in a plurality of extractors can be selected based on the determined format to extract the portion of data from the container. The driver 206 can select a specific extractor 208-212 for extraction of data from a container (e.g., raw data 214). At 706, the data can be extracted from the container using the selected extractor 208-212. At 708, a structure of the extracted data can be generated. The structure can be used for performing analysis of a content of the extracted data.

In some implementations, the current subject matter can include one or more of the following optional features. The method can also include determining, based on the extracted portion of data, whether additional data is to be extracted from the container; extracting the additional data from the container based on the additional data having a first format, where the first format can identify data allowed to be extracted; and preventing extraction of the additional data from the container based on the additional data having a second format, where the second format can identify data that is not allowed to be extracted.

In some implementations, the selected extractor can include at least one of the following: a built-in extractor, an external extractor, and a remote extractor.

In some implementations, the container can include at least one of the following: a data, a metadata, a structured content data, an unstructured content data, another container of data, a hard disk, a memory card (e.g., an SD card), a cellular telephone memory, a main memory image, a forensic container, a zip file, a file, a memory image, an email message, a text, a video, an audio, a graphic, and any combination thereof.

In some implementations, the method can include generating at least one hash identifying the extracted data, and determining, based on the generated hash, whether to extract another portion of data contained in at least one of the following: the container and at least another container.

In some implementations, extraction of data can include parsing the data contained in the container, and extracting, based on parsing, the data.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
analyzing, using at least one first processor, at least one container of data to determine a first format of at least a portion of data contained in the at least one container, the at least one container including a plurality of nested containers, each nested container in the plurality of nested containers containing additional data, the data and the additional data having a plurality of formats, each format being associated with a hash stored in a table of hashes;
selecting, using the at least one first processor, based on the determined first format of at least a portion of data and a corresponding first hash in the table of hashes, at least one extractor in a plurality of extractors to extract at least a portion of data from the at least one container, the first format and the first hash identifying data allowed to be extracted from the container;
extracting, using the at least one first processor, at least a portion of data having the first format from the at least one container;
identifying, using the at least one first processor, the additional data contained in at least one nested container, the additional data being associated with a second hash in the table of hashes, and preventing extraction of the additional data from the at least one nested container in the plurality of nested containers based on the data having a second format and being associated with the second hash, the second format and the second hash identifying data not allowed to be extracted from the at least one nested container;
generating, using the at least one first processor, a structure of the extracted at least a portion of data and the additional data prevented from extraction for performing analysis of a content of the extracted at least a portion of data and transmitting the generated structure to at least one second processor; and
performing, using the at least one second processor, a forensic analysis of the content of the generated structure.

2. The method according to claim 1, wherein the at least one extractor includes at least one of the following: a built-in extractor, an external extractor, and a remote extractor.

3. The method according to claim 1, wherein the at least one container includes at least one of the following: a data, a metadata, a structured content data, an unstructured content data, another container of data, a hard disk, a memory card, a cellular telephone memory, a main memory image, a forensic container, a zip file, a file, a memory image, an email message, a text, a video, an audio, a graphic, and any combination thereof.

4. The method according to claim 1, further comprising
generating at least one hash identifying the extracted at least one portion of data; and
determining, based on the generated at least one hash, whether to extract at least another portion of data contained in at least one of: the at least one container and at least another container.

5. The method according to claim 1, wherein the extracting further comprises
parsing the at least a portion of data contained in the at least one container; and
extracting, based on parsing, the at least a portion of data.

6. A system comprising:
at least one programmable processor; and
a machine-readable medium storing instructions that, when executed by the at least one programmable processor, cause the at least one programmable processor to perform operations comprising:
analyzing, using at least one first processor, at least one container of data to determine a first format of at least a portion of data contained in the at least one container, the at least one container including a plurality of nested containers, each nested container in the plurality of nested containers containing additional data, the data and the additional data having a plurality of formats, each format being associated with a hash stored in a table of hashes;
selecting, using the at least one first processor, based on the determined first format of at least a portion of data and a corresponding first hash in the table of hashes, at least one extractor in a plurality of extractors to extract at least a portion of data from the at least one container, the first format and the first hash identifying data allowed to be extracted from the container;
extracting, using the at least one first processor, at least a portion of data having the first format from the at least one container;
identifying, using the at least one first processor, the additional data contained in at least one nested container, the additional data being associated with a second hash in the table of hashes, and preventing extraction of the additional data from the at least one nested container in the plurality of nested containers based on the data having a second format and being associated with the second hash, the second format and the second hash identifying data not allowed to be extracted from the at least one nested container;
generating, using the at least one first processor, a structure of the extracted at least a portion of data and the additional data prevented from extraction for performing analysis of a content of the extracted at least a portion of data and transmitting the generated structure to at least one second processor; and performing, using the at least one second processor, a forensic analysis of the content of the generated structure.

7. The system according to claim 6, wherein the at least one extractor includes at least one of the following: a built-in extractor, an external extractor, and a remote extractor.

8. The system according to claim 6, wherein the at least one container includes at least one of the following: a data, a metadata, a structured content data, an unstructured content data, another container of data, a hard disk, a memory card, a cellular telephone memory, a main memory image, a forensic container, a zip file, a file, a memory image, an email message, a text, a video, an audio, a graphic, and any combination thereof.

9. The system according to claim 6, wherein the operations further comprise generating at least one hash identifying the extracted at least one portion of data; and determining, based on the generated at least one hash, whether to extract at least another portion of data contained in at least one of: the at least one container and at least another container.

10. The system according to claim 6, wherein the extracting further comprises parsing the at least a portion of data contained in the at least one container; and extracting, based on parsing, the at least a portion of data.

11. A computer program product comprising a non-transitory machine-readable medium storing instructions that, when executed by at least one programmable processor, cause the at least one programmable processor to perform operations comprising:

analyzing, using at least one first processor, at least one container of data to determine a first format of at least a portion of data contained in the at least one container, the at least one container including a plurality of nested containers, each nested container in the plurality of nested containers containing additional data, the data and the additional data having a plurality of formats, each format being associated with a hash stored in a table of hashes;

selecting, using the at least one first processor, based on the determined first format of at least a portion of data and a corresponding first hash in the table of hashes, at least one extractor in a plurality of extractors to extract at least a portion of data from the at least one container, the first format and the first hash identifying data allowed to be extracted from the container;

extracting, using the at least one first processor, at least a portion of data having the first format from the at least one container;

identifying, using the at least one first processor, the additional data contained in at least one nested container, the additional data being associated with a second hash in the table of hashes, and preventing extraction of the additional data from the at least one nested container in the plurality of nested containers based on the data having a second format and being associated with the second hash, the second format and the second hash identifying data not allowed to be extracted from the at least one nested container;

generating, using the at least one first processor, a structure of the extracted at least a portion of data and the additional data prevented from extraction for performing analysis of a content of the extracted at least a portion of data and transmitting the generated structure to at least one second processor; and performing, using the at least one second processor, a forensic analysis of the content of the generated structure.

12. The computer program product according to claim 11, wherein the at least one extractor includes at least one of the following: a built-in extractor, an external extractor, and a remote extractor.

13. The computer program product according to claim 11, wherein the at least one container includes at least one of the following: a data, a metadata, a structured content data, an unstructured content data, another container of data, a hard disk, a memory card, a cellular telephone memory, a main memory image, a forensic container, a zip file, a file, a memory image, an email message, a text, a video, an audio, a graphic, and any combination thereof.

14. The computer program product according to claim 11, wherein the operations further comprise generating at least one hash identifying the extracted at least one portion of data; and determining, based on the generated at least one hash, whether to extract at least another portion of data contained in at least one of: the at least one container and at least another container.

15. The computer program product according to claim 11, wherein the extracting further comprises parsing the at least a portion of data contained in the at least one container; and extracting, based on parsing, the at least a portion of data.

* * * * *